(12) United States Patent
Rohrbach et al.

(10) Patent No.: US 7,316,782 B2
(45) Date of Patent: Jan. 8, 2008

(54) FILTER APPARATUS FOR REMOVING SULFUR-CONTAINING COMPOUNDS FROM LIQUID FUELS, AND METHODS OF USING SAME

(75) Inventors: Ronald Paul Rohrbach, Flemington, NJ (US); Russell Johnson, Elmhurst, IL (US); Peter D. Unger, Morristown, NJ (US); Gordon William Jones, Wakefield, RI (US); Damiel E. Bause, Flanders, NJ (US); Gary B. Zulauf, Findlay, OH (US)

(73) Assignee: Honeywell International, Inc., Morristown, NJ (US)

( * ) Notice: Subject to any disclaimer, the term of this patent is extended or adjusted under 35 U.S.C. 154(b) by 426 days.

(21) Appl. No.: 10/918,298

(22) Filed: Aug. 13, 2004

(65) Prior Publication Data
US 2005/0016927 A1 Jan. 27, 2005

Related U.S. Application Data

(62) Division of application No. 09/974,694, filed on Oct. 10, 2001, now Pat. No. 6,887,381.

(51) Int. Cl.
*B01D 21/01* (2006.01)
(52) U.S. Cl. ............ 210/723; 210/660; 210/916; 210/902
(58) Field of Classification Search ............ 210/723, 210/660, 916, 902
See application file for complete search history.

(56) References Cited

U.S. PATENT DOCUMENTS

| | | | |
|---|---|---|---|
| 2,618,586 A | 11/1952 | Hendel | |
| 3,883,637 A * | 5/1975 | Benedict | 423/230 |
| 4,113,606 A | 9/1978 | Mulaskey | |
| 4,168,225 A | 9/1979 | Jackson | |
| 4,211,639 A * | 7/1980 | Jackson | 208/188 |
| 4,523,532 A | 6/1985 | Moriarty | |
| 4,895,640 A | 1/1990 | Jackson | |
| 4,902,408 A | 2/1990 | Reichert et al. | |
| 5,057,368 A | 10/1991 | Largman et al. | |
| 5,094,747 A | 3/1992 | Johnson | |
| 5,199,978 A | 4/1993 | Poirier et al. | |
| 5,472,875 A | 12/1995 | Monticello | |
| 5,704,966 A | 1/1998 | Rohrbach et al. | |
| 5,713,971 A | 2/1998 | Rohrbach et al. | |

(Continued)

FOREIGN PATENT DOCUMENTS

DE 157 197 A 10/1982

(Continued)

OTHER PUBLICATIONS

International Search Report, PCT/US02/32372, Feb. 20, 2003.

*Primary Examiner*—Chester T. Barry

(57) ABSTRACT

A fuel filter for removing fuel impurities, particularly thiophenes, includes a hollow housing having a filter element therein. The filter element includes a substrate, which may include a nonwoven fiber web, a plurality of particles, or both of these. Where particles are used, the substrate may be homogeneous or may be a mixture of different particles. The substrate may include a sorbent selected from the group consisting of metals, metal oxides, metallic salts, organometallic compounds, catalysts, and oxidizing agents. Optionally, a sulfur-treating reactant may be operatively associated with the substrate to reduce the concentration of thiophenes in fuel passing through the filter.

11 Claims, 12 Drawing Sheets

U.S. PATENT DOCUMENTS

| | | |
|---|---|---|
| 5,744,236 A | 4/1998 | Rohrbach et al. |
| 5,759,394 A | 6/1998 | Rohrbach et al. |
| 5,891,221 A | 4/1999 | Rohrbach et al. |
| 5,900,153 A | 5/1999 | Sanford |
| 5,902,384 A | 5/1999 | Rohrbach et al. |
| 5,942,323 A | 8/1999 | England |
| 5,951,744 A | 9/1999 | Rohrbach et al. |
| 6,004,381 A | 12/1999 | Rohrbach et al. |
| 6,048,614 A | 4/2000 | Rohrbach et al. |
| 6,117,802 A | 9/2000 | Rohrbach et al. |
| 6,127,036 A | 10/2000 | Xue et al. |
| 6,129,835 A | 10/2000 | Lesieur et al. |
| 6,235,519 B1 | 5/2001 | Wang et al. |
| 2002/0136936 A1 | 9/2002 | Grieve et al. |

FOREIGN PATENT DOCUMENTS

| | | |
|---|---|---|
| DE | 42 00 376 A | 7/1993 |
| GB | 203 354 | 9/1923 |
| GB | 904 480 | 8/1962 |
| SU | 572 072 | 4/1980 |
| WO | WO 01/62871 A | 8/2001 |

\* cited by examiner

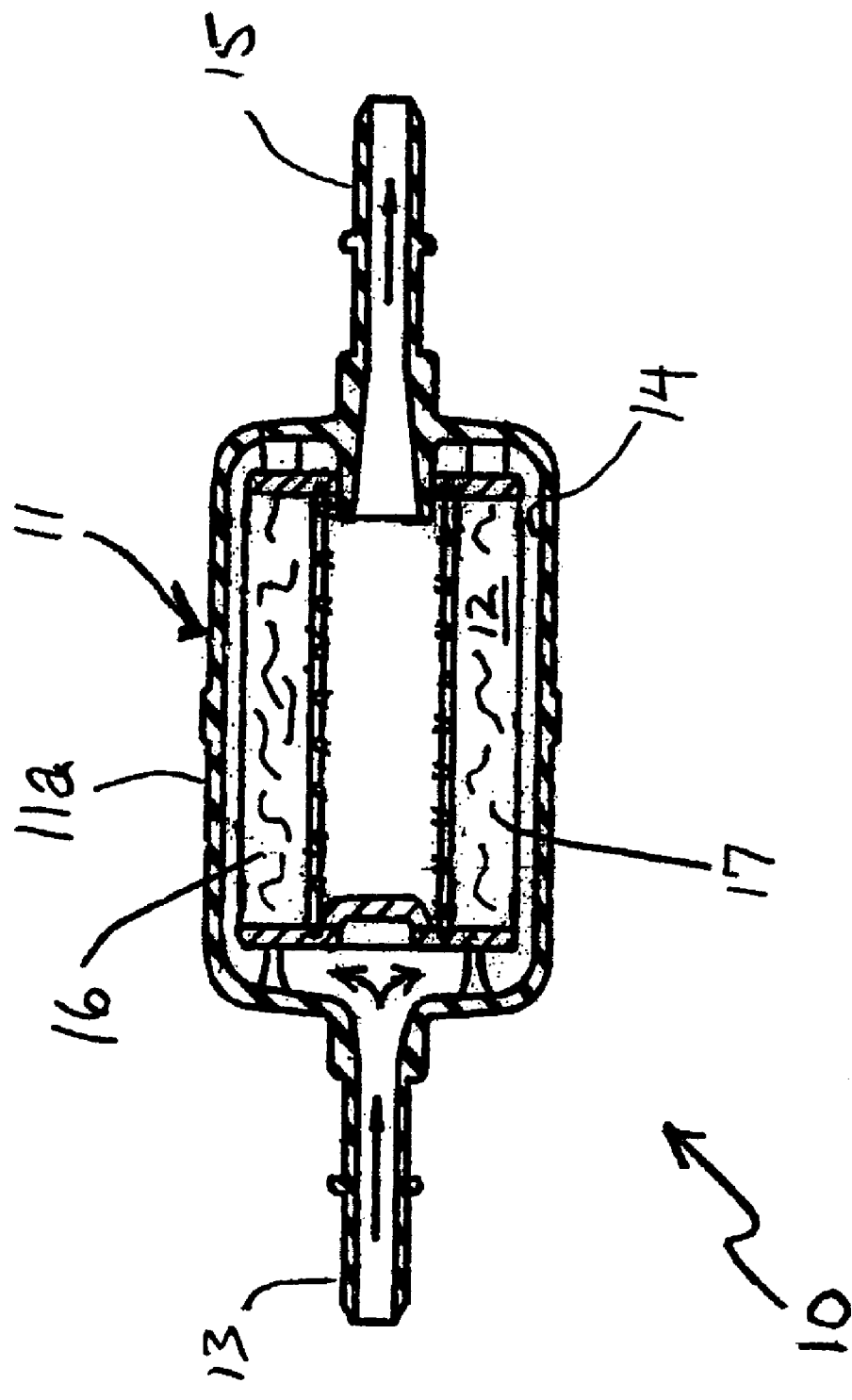

FILTER APPARATUS FOR REMOVING SULFUR-CONTAINING COMPOUNDS FROM LIQUID FUELS, AND METHODS OF USING SAME

CROSS-REFERENCE TO RELATED APPLICATIONS

This application is a division of patent application Ser. No. 09/974,694, filed Oct. 10, 2001, now U.S. Pat. No. 6,887,381.

BACKGROUND OF THE INVENTION

1. Field of the Invention

The present invention relates to a fuel filter for removing sulfur-containing compounds from liquid fuels, and to methods of using same. More particularly, the present invention relates to an in-line fuel filter for removing thiophenes and similar compounds from liquid fuels at a point of use thereof, and to methods of filtering fuels using the described filter.

2. Description of the Background Art

Virtually every internal combustion engine-equipped vehicle on the road today is equipped with a fuel filter, to filter out imputities such as bits of dirt and the like from the fuel.

It has been known to use activated carbon and/or other sorbent materials in a fuel filter to remove paraffins and polynuclear aromatics (PNAs). Examples of these types of fuel filters are given in U.S. Pat. Nos. 5,094,747 and 5,900,.

The useful life of post-combustion emission control devices, such as catalytic converters, is adversely affected by the presence of sulfur-containing compounds in vehicle exhaust.

Due to concerns about the environment, it is expected that new, stricter standards for liquid fuel refining will soon be implemented, lowering the allowable amount of sulfur-containing compounds permitted to be present in liquid hydrocarbon fuels, such as gasoline, fuel oil, and diesel fuel.

Furthermore, it is well known that very small concentrations of sulfur-related compounds in gasoline may generate "rotten egg" or other objectionable odors in vehicle exhaust. Nearly every driver has been caught behind or near another vehicle which is burning sulfur-containing fuel. It is therefore advantageous to minimize the concentration of sulfur-containing compounds in liquid fuels.

In addition, the development of new technologies, such as fuel cells, will soon require high-purity liquid hydrocarbon fuels for processing. Sulfur-containing compounds, if present in fuel, are likely to adversely affect such new technologies.

Petroleum fuel refiners continue to improve manufacturing processes, to minimize the sulfur content of fuels.

However, notwithstanding the ongoing efforts of industry to minimize sulfur content, many commercially available liquid fuels still include some sulfur compounds therein, such as thiophenes and similar compounds.

Although petroleum refiners continue to work on sulfur removal, little has been done in the area of post-refinery fuel filtration to remove sulfur-containing compounds from fuels at a point of use thereof.

There have been some limited efforts to filter sulfur and other contaminants out of gasoline by the end user, after the gas has been installed in a vehicle. For example, U.S. Pat. No. 4,895,640 to Jackson discloses a method for removing impurities from a petroleum fuel. While this reference mentions sulfur compounds as one type of filterable impurity, it is not focused strictly on sulfur compounds.

As disclosed in U.S. Pat. No. 4,895,640, the method of Jackson includes a step of filtering fuel through a two-part filter arrangement, in which a first filter includes a cellulosic material, a solid organic acid and a chromate compound. In the claimed method of Jackson, the fuel is also passed through a second filter apparatus containing a cellulosic material, the second filter apparatus also containing water. In following the method of Jackson, the filter apparatus is electrically grounded. A similar invention by Jackson is disclosed in U.S. Pat. No. 4,211,639.

The assignee of the present invention has developed a new type of 'wicking' fiber material that has been used for some filter applications. This material includes hollow spaces within the individual fibers, and this hollow space may be used to house a reactive or adsorbent material. Some issued patents relating to this wicking fiber, and to filters containing this type of fiber include U.S. Pat. Nos. 5,057,368, 5,704,966, 5,713,971, 5,744,236, 5,759,394, 5,891,221, 5,902,384, 5,951,744, 6,004,381, 6,048,614, 6,117,802, and 6,127,036. Other patents using this fiber technology are pending.

A need still exists in the art for a fuel filter for installation at a point of use of fuel, such as on a vehicle, which filter is adapted to reduce the concentration of sulfur-containing compounds in a liquid fuel.

SUMMARY OF THE INVENTION

The present invention provides an in-line fuel filter, for filtering a liquid fuel at a point of use thereof, and for reducing the concentration of sulfur compounds therein. One particularly preferred application, in which the filter hereof is adapted to be used, is on a vehicle.

A fuel filter according to the present invention includes a housing with a hollow, thin-walled housing body defining a chamber therein. The housing is preferably made of a durable plastic which is tolerant to hydrocarbons, such as a polyacetal.

The fuel filter housing also includes an inlet connected to the housing body and in fluid communication with the chamber thereof, and an outlet connected to the housing body and in fluid communication with the chamber thereof.

A fuel filter according to the present invention further includes filter media, disposed in the housing chamber, for filtering liquid fuel and for removing sulfur compounds therefrom. The filter media has a sulfur-treating composition thereon for reacting with sulfur-containing compounds, and for reducing the amount of sulfur-containing compounds present in the fuel.

The filter media may include a plurality of substrate particles; and a reagent operatively associated with at least some of the substrate particles. Preferably, the reagent selected is capable of reacting with thiophenes. The substrate particles may include a substance selected from the group consisting of activated carbon, zeolites, clay, silica gel, silicon dioxide, aluminum oxide and mixtures thereof.

The sulfur-treating composition may include a composition selected from the list consisiting of metals, metal oxides, metal salts, solvents, emulsions, electron-acceptors, oxidizing agents, organometallic compounds, catalysts, precipitating agents, and mixtures thereof.

Accordingly, it is an object of the present invention to provide a method and apparatus for removing sulfur-containing compounds from a liquid fuel, at a point use of the fuel. A preferred application for the filter hereof is on a vehicle, although the filter is also usable in stationary applications.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2 is a medial cross-sectional view of the fuel filter of FIG. 1, taken along a plane passing through the longitudinal axis thereof;

DETAILED DESCRIPTION OF THE PREFERRED EMBODIMENTS

First Embodiment

Figure 1:
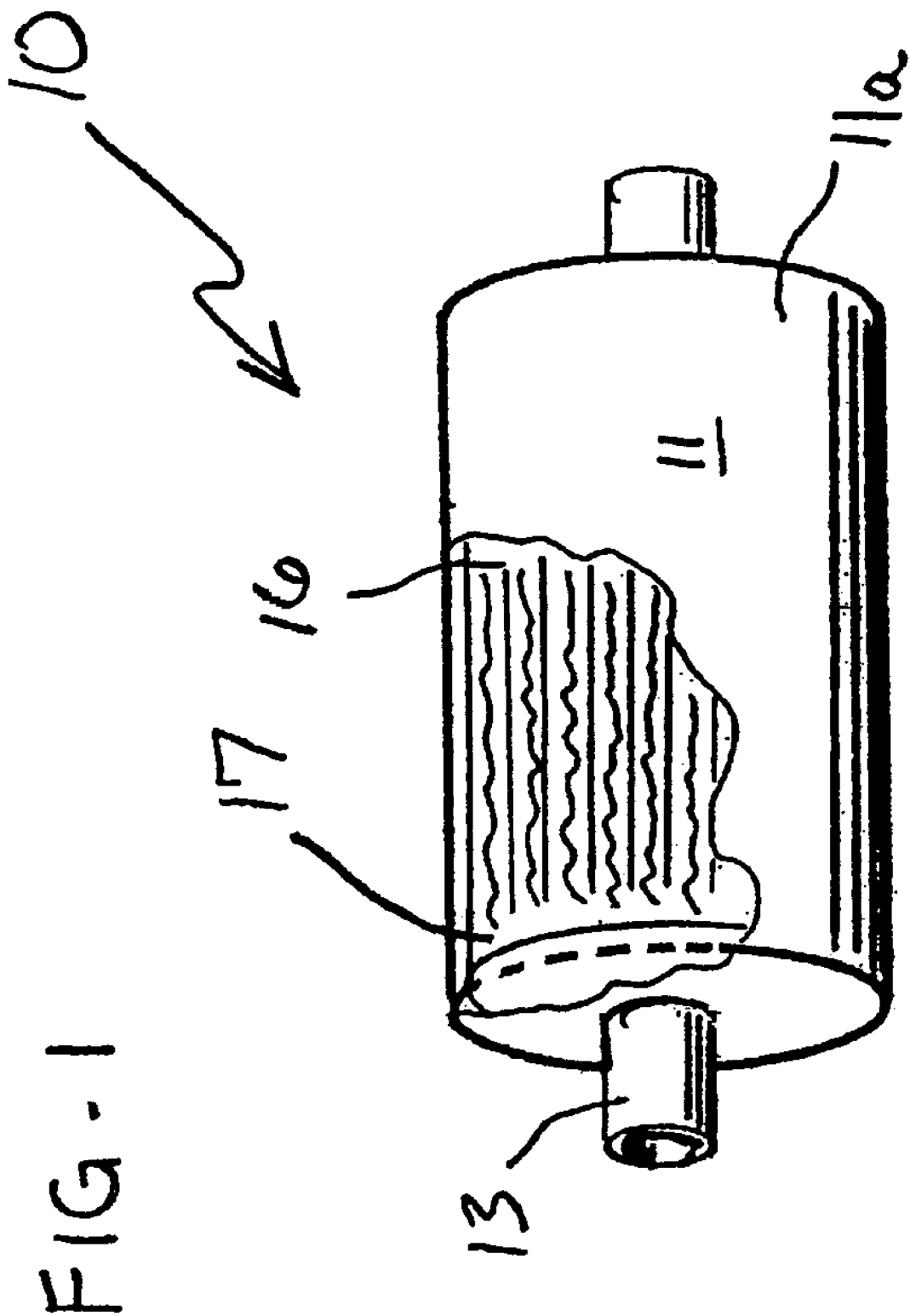
FIG. 1 is a perspective view, partially broken away, of a fuel filter according to a first embodiment of the present invention.

Referring now to FIGS. 1-2 of the drawings, a sulfur-reducing fuel filter, according to a first embodiment of the present invention, is shown generally at 10. The fuel filter 10 is provided to filter a liquid fuel at a point of use thereof, and to remove sulfur compounds therefrom.

The direction of fuel flow through the filter is shown by the arrows in FIG. 2.

Illustrative and non-limiting examples of liquid fuels, which the filter 10 may be used to filter, include gasoline, diesel fuel, methanol, ethanol, fuel oil, and mixtures thereof.

One particularly preferred application, in which the filter hereof is adapted to be used, is on a vehicle. Another application is to filter a liquid hydrocarbon-based fuel, in preparation for using the fuel to power a fuel cell.

A fuel filter 10 according to the embodiment of FIGS. 1-2 includes a thin-walled hollow housing 11, including a housing body 11a defining a chamber 14 therein. The housing 11 may have electrically conductive materials, such as carbon powder, carbon fibers, and/or stainless steel fibers incorporated thereinto in order to minimize static buildup therein, and thereby to minimize any risk of a spark, caused by static electricity, igniting a fire.

The housing body 11a may be made substantially cylindrical in shape, as shown.

The housing body 11a is preferably made of a durable plastic which is tolerant to hydrocarbons, such as a polyacetal.

The fuel filter housing 11 according to the embodiment of FIG. 1 includes an inlet 13 and an outlet 15, each connected to the housing body 11a and in fluid communication with the chamber 14 thereof.

A fuel filter 10 according to the first embodiment of the invention further includes a porous filter media 16 including a fiber web 12, disposed in the chamber of the housing, for filtering liquid fuel and for removing unwanted impurities, such as polynuclear aromatic hydrocarbons (PNAs) and/or sulfur compounds therefrom. Preferably, the filter media 16 is provided in the form of a hollow, cylindrical filter element 17, having a sulfur-treating composition operatively associated therewith for reacting with sulfur-containing compounds.

As used throughout the present specification and in the claims, the term "sulfur-treating composition" means a reagent composition which is capable of chemically interacting with sulfur or with a sulfur-containing compound. This specifically includes, but is not limited to solvents which are capable of dissolving one or more sulfur-containing compounds therein, as well as catalysts and/or reagents selected for their ability to convert thiophenes into other compounds.

In the embodiment of FIGS. 1-2, the filter media 16 is provided in the form of a porous filter element 17 including a non-woven fiber web 12 made up of a plurality of intertwined non-woven fibers. In the embodiment of FIG. 1, the filter element 17 preferably includes a plurality of hollow wicking fibers 20.

The Wicking Fibers

As noted, the filter element 17 includes a nonwoven fiber web 12, which is retained in the housing 11. The fiber web 12 is formed from a multiplicity of intertwined wicking fibers 20, as shown in FIGS. 3 through 6, containing a reagent selected for its capacity to react with the specific fuel being filtered, so as to provide an additive thereto and/or to remove unwanted materials, such as thiophenes, other sulfur-containing compounds, PNAs, and other contaminants therefrom.

Figure 3:
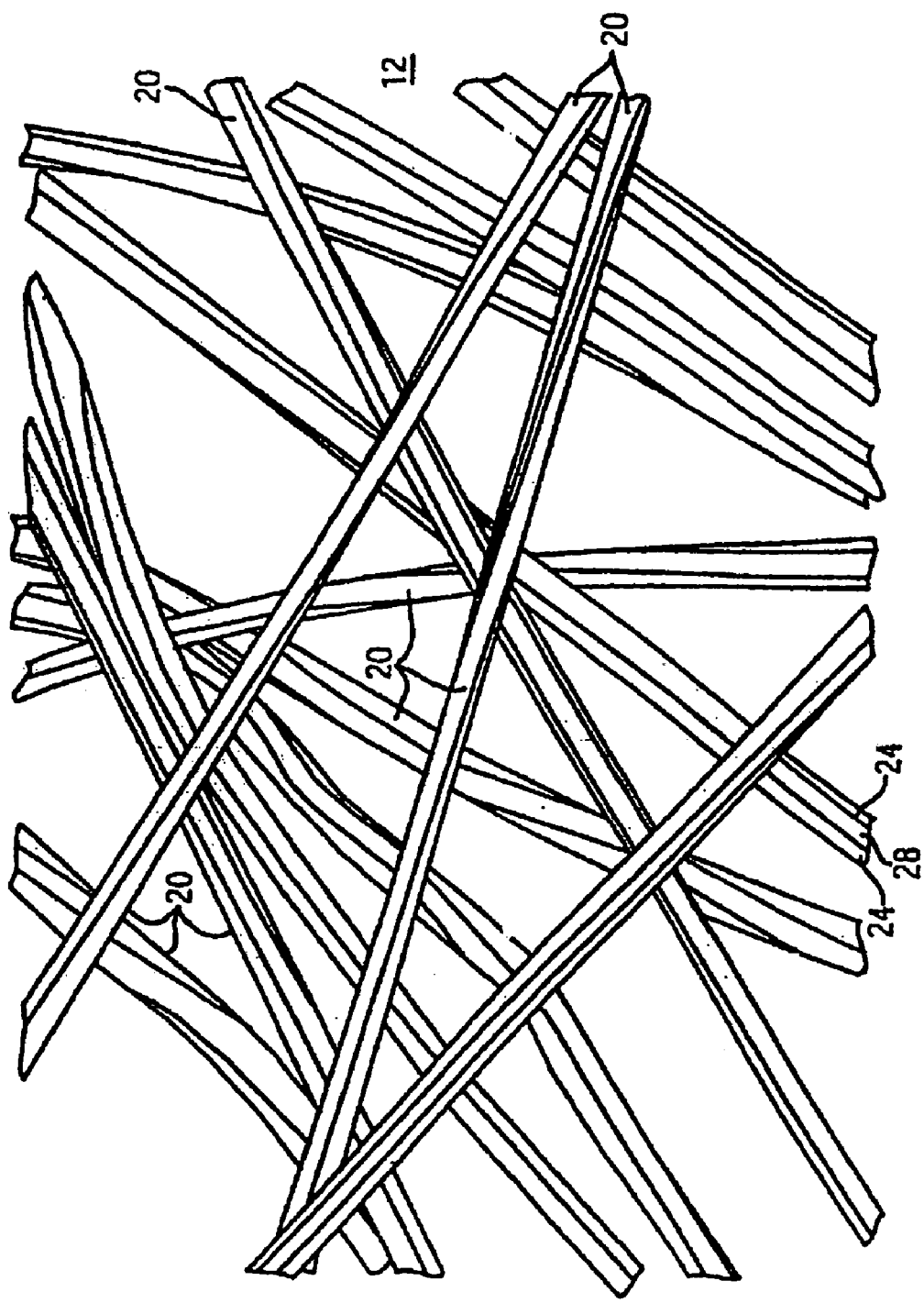
FIG. 3 is an enlarged perspective detail view of a portion of a nonwoven fiber web, which is one component of the fuel filter of FIG. 2.
Figure 4:
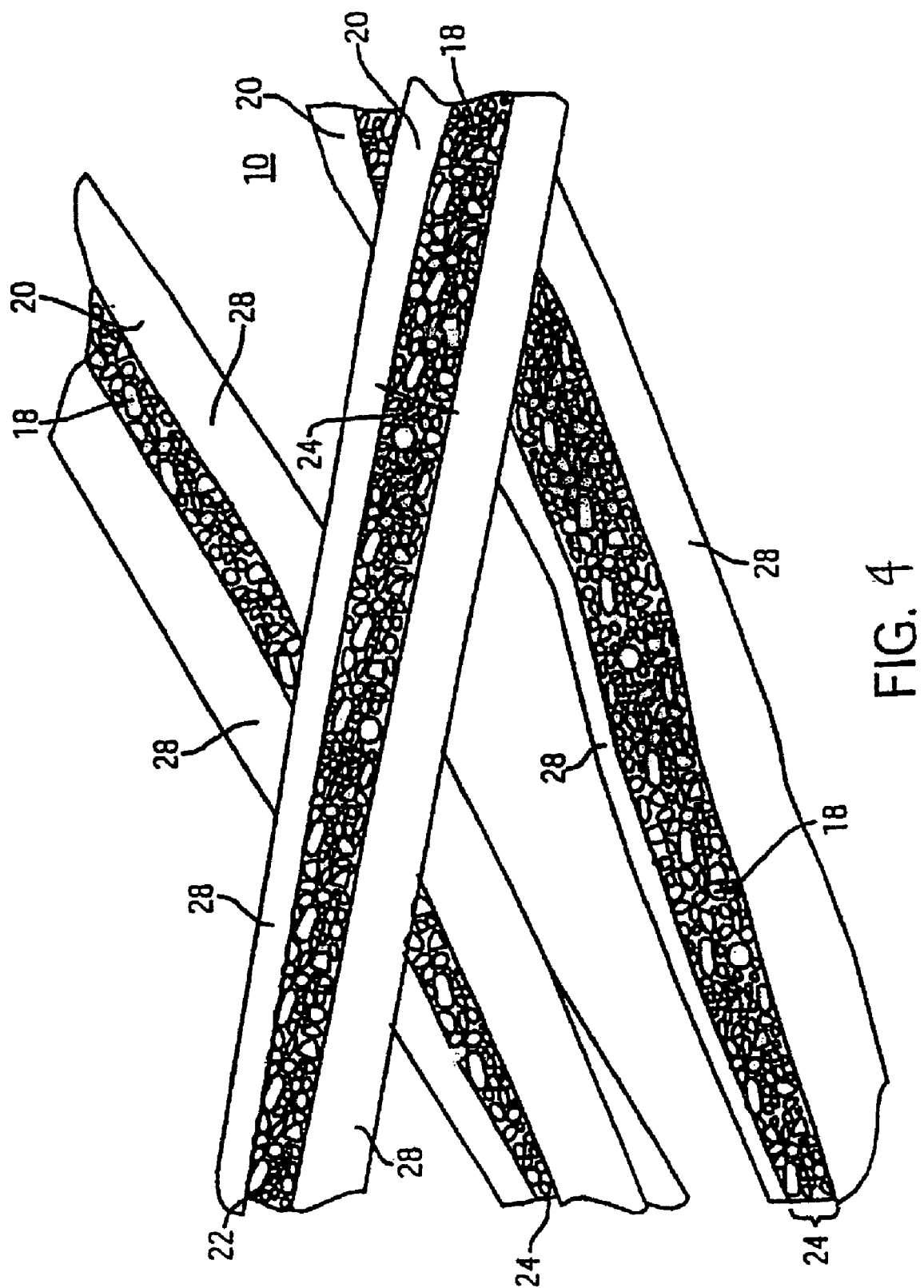
FIG. 4 is a further enlarged perspective detail view of a portion of the nonwoven fiber web of FIGS. 2-3, showing a solid component entrained in the cavities of the fibers thereof.
Figure 5:
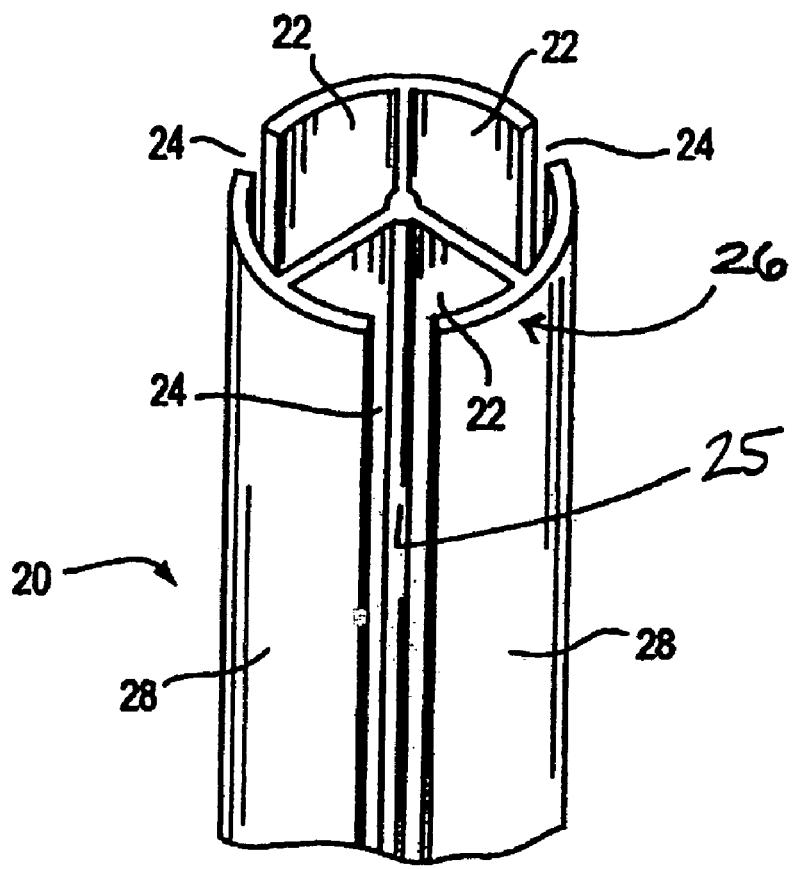
FIG. 5 is an enlarged perspective view of the three-lobed wicking fiber, which is usable in the practice of the present invention.

FIGS. 3-5 show the fibers 20 making up the web 12 in an increasing level of detail and magnification in each succeeding figure.

For instance, FIG. 3 shows a detail view of a number of the intertwined fibers 20 making up the web 12.

FIG. 4 shows a further magnified detail view of the fibers 20, and also shows a number of solid particles 18 as one example of a reagent which may be disposed therein.

FIG. 5 is a close-up detail perspective view of an end of one preferred fiber 20, with the reagent deleted from the drawing for purposes of illustration.

Figure 6:
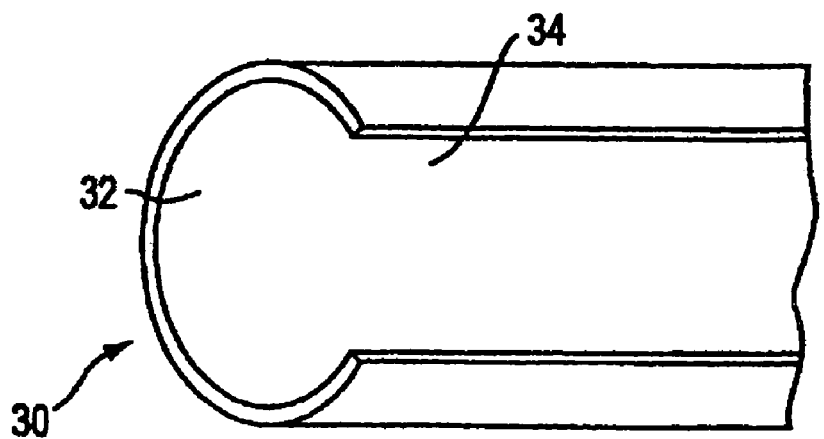
FIG. 6 is an enlarged perspective view of an alternative wicking fiber which is usable in the practice of the present invention, having a C-shaped cross-section with a single cavity formed therein.
Figure 7:
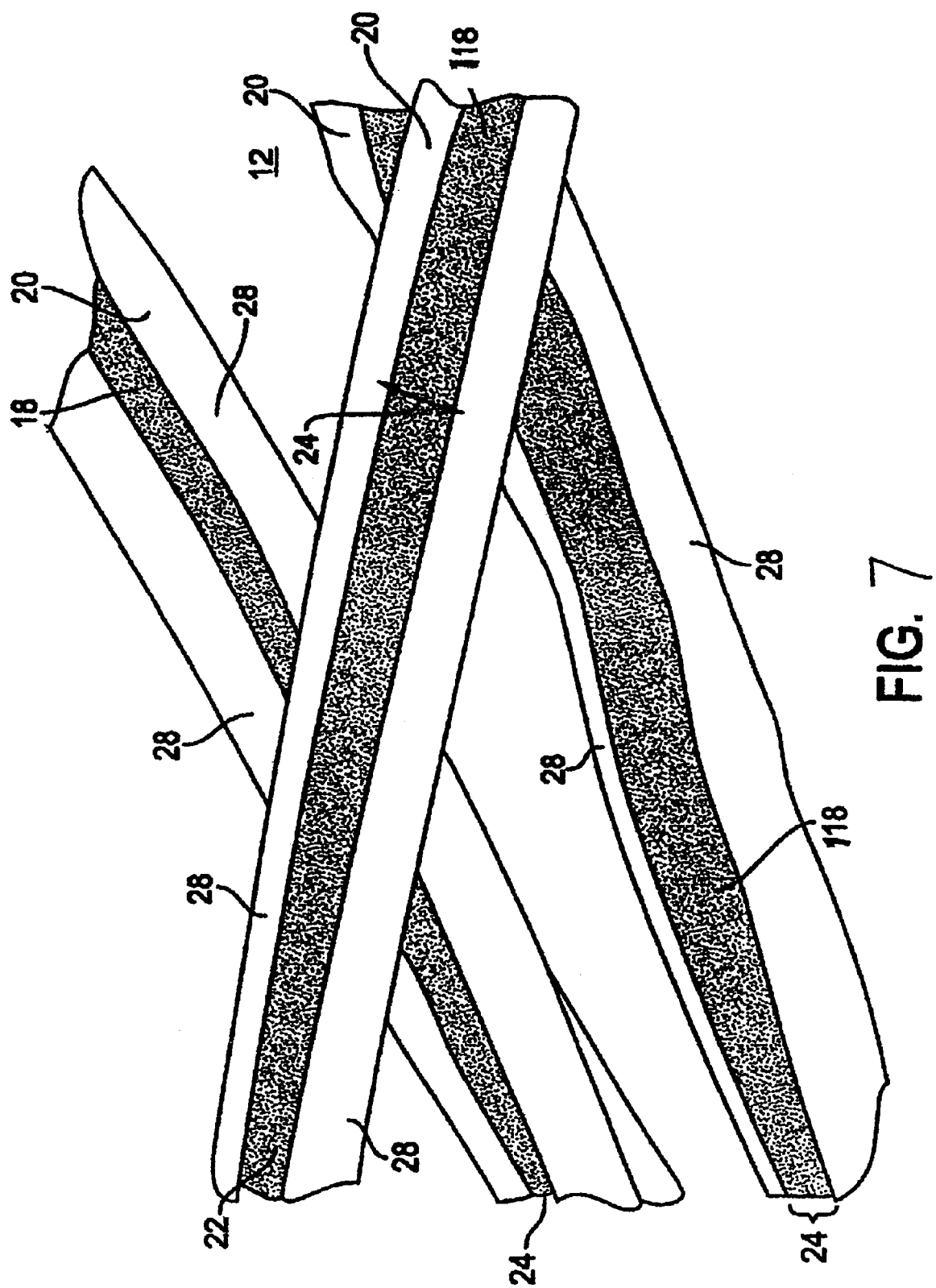
FIG. 7 is an enlarged perspective detail view of the nonwoven fiber mat of FIGS. 2-3, showing a liquid component entrained in the cavities of the fibers.

FIG. 6 shows an alternative configuration for a fiber 30 which is usable in the practice of the present invention.

A wicking fiber that is particularly suitable for practicing this invention is disclosed in U.S. Pat. No. 5,057,368, the disclosure of which is incorporated by reference. This patent discloses a fiber formed from thermoplastic polymers, wherein the fiber has a cross-section with a central core or stem 25, and a plurality of substantially T-shaped lobes 26 (FIG. 5). The legs of the lobes 26 intersect at the core 25, so that the angle formed between the legs of adjacent lobes falls in a range from about 80 degrees to about 130 degrees.

The wicking fiber 20, in the embodiment illustrated in FIG. 5, is formed as an extruded strand having three hollow longitudinally extending interior cavities 22, each of which communicates with the outer strand surface by way of a longitudinally extending slot 24 defined between adjacent lobes 26.

The three cross-sectionally T-shaped segments may have their outer surface 28 curved, as shown, or straight. While the wicking fiber 20 is depicted as tri-lobed in FIG. 5, it will be understood that any other number of lobes are suitable, particularly two, four or five lobes.

The wicking fibers 20 are relatively small, having a diameter in a range between 30 and 250 microns. The width of the longitudinal extending slots 24 is normally less than one half of the diameter of the fibers 20.

Referring now to FIGS. 4 and 5, the fiber 20, the width of the slots 24, and the particles 18 to be entrapped within the interior cavities 22, are each selected so that, when the particles 18 are forced into the longitudinal cavities 22, they are retained therein. The small solid particles 18 become mechanically trapped within the longitudinal cavities 22 of the fibers 20, and are retained therein, as noted. This approach can be extended to substantially any powder, or other finely divided solid material, which one would like to entrap within a fiber medium.

Optionally, if desired, after the fine solid particles are entrapped, the wicking fiber 20 may additionally be impregnated with a liquid reagent.

Alternatively, the wicking fiber may be impregnated solely with a liquid reagent. Where a liquid reagent is used, it is preferably a reagent which is insoluble or only slightly soluble in the fuel being filtered, to avoid being washed out of the filter. However, the reagent should be one which attracts thiophenes and related compounds due to an excellent solubility of thiophenes therein.

The capillary forces within the individual cavities 22 are much greater than those external to the fiber 20, such that a liquid reagent is readily wicked up within the interior of the fiber 20 without appreciable wetting of the external surfaces 28 or filling the inter-fiber voids. The fibers 20 strongly retain the liquid through capillary action, so that the nonwoven web 12 is not wet to the touch, and the liquid will not shake off. In a nonwoven web 12 of such wicking fibers 20 the area between the individual strands remains relatively free of the fine particles 18, and of any liquid reagent with which the internal cavities 22 of each fiber 20 are filled.

The fibers 20 may be made of one or more type of wicking material strands such as polyamides, polyimides, polyesters, polysulfones, polyolefins, or other suitable polymeric material which may be formed into the desired configuration, and which is stable with respect to the reagent stored therein and the fluid being filtered therethrough. The specific polymer selected for a fuel filter application should be a polymer which exhibits stability, for an extended period of time, immersed in the liquid fuel with which it is to be used.

In addition other internal wicking fibers may be used, such as the C-shaped fiber shown in FIG. 6, having a single longitudinal extending slot 34, and a single longitudinally extending cavity 32. Other cross-sectional shapes may also be suitable for retaining reagents therein. The specific shape of the wicking fibers is not critical, so long as the fibers selected can hold the reagent within its cavities 22 such that it is not easily displaced.

Where a solid material 18 is stored within the cavities 22 of the fibers 20, it may be a sorbent material selected from the group consisting of activated carbon, zeolites, clay, silica gel, silicon dioxide, aluminum oxide and mixtures thereof.

Optionally, where used, this sorbent material may further be treated with a coating of, or may otherwise be operatively associated with, a separate sulfur-treating reagent. The sulfur-treating reagent may be selected from the group consisting of metals, metal oxides, metallic salts, organometallic compounds, catalysts, and oxidizing agents.

Figure 2A:
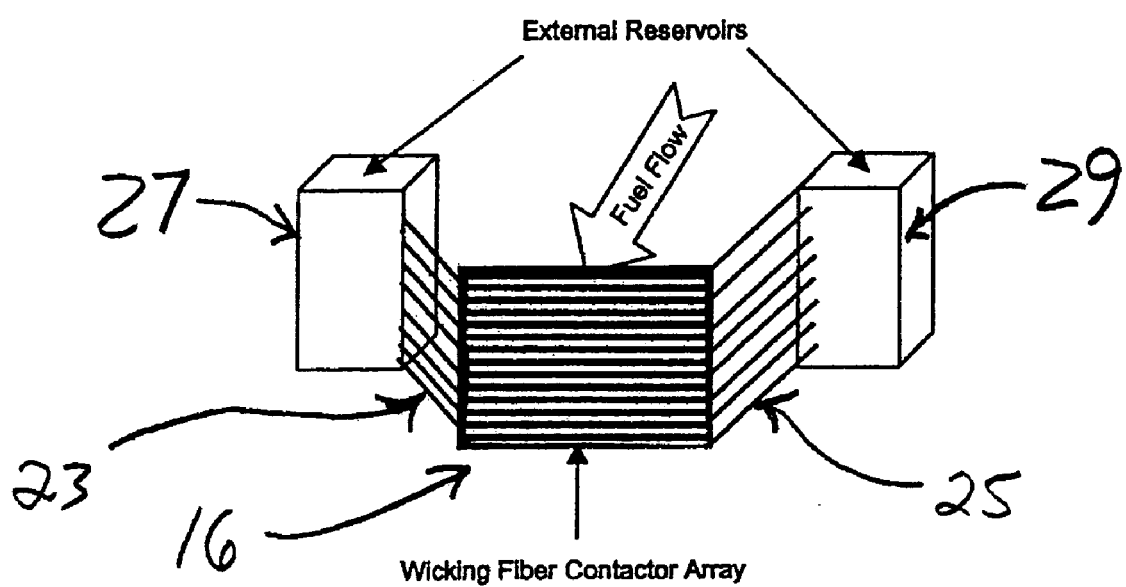
FIG. 2A is a schematic figure of a variation of fuel filter 10 of FIG. 1.

A variation on the fuel filter 10 of FIGS. 1-2 is shown diagrammatically in FIG. 2A. In the variation of FIG. 2A, the filter media 16 is connected via fluid conduits 23, 25 to one or more external fluid reservoirs 27, 29, thereby keeping the external fluid reservoirs in fluid communication with the filter media.

In the embodiment of FIG. 2A, the external fluid reservoirs contain an appropriate solvent or other fluid selected for its ability to treat or trap sulfur-containing compounds, particularly thiophenes. The fluid conduits 27, 29 could include additional wicking fibers 20 therein of the type described above and shown in FIGS. 3-6.

Those in the relevant art will realize that this variation would be constructed and arranged in a manner so as to seal the fluid conduits 23, 25 from the outer environment, and to prevent any outward escape of fuel therefrom. This may be accomplished by containing the fluid conduits 23, 25 within flexible, fuel-tolerant hoses.

Second Embodiment

Figure 8:
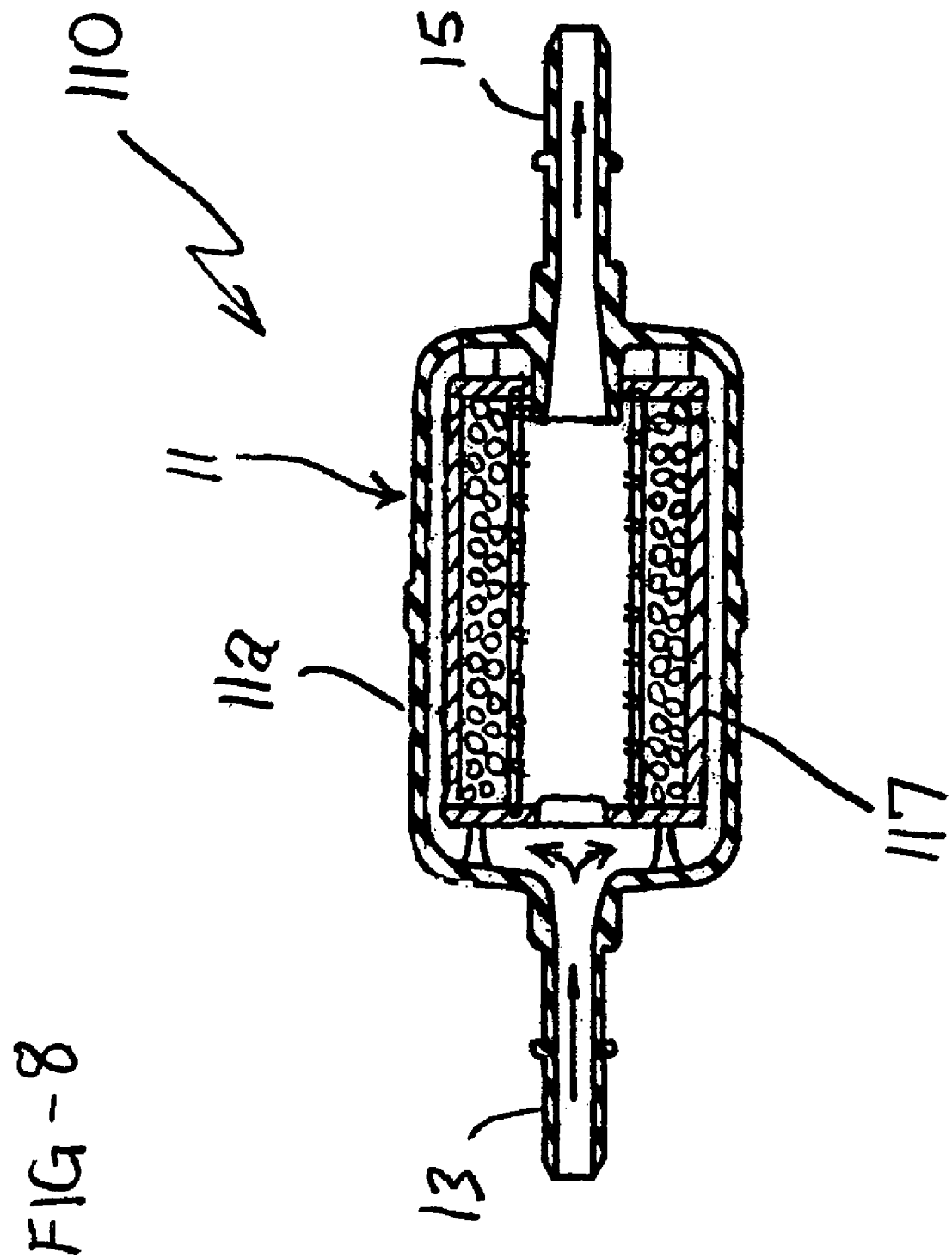
FIG. 8 is a medial cross-sectional view of the fuel filter according to a second embodiment of the present invention, taken along a plane passing through the longitudinal axis thereof.
Figure 9:
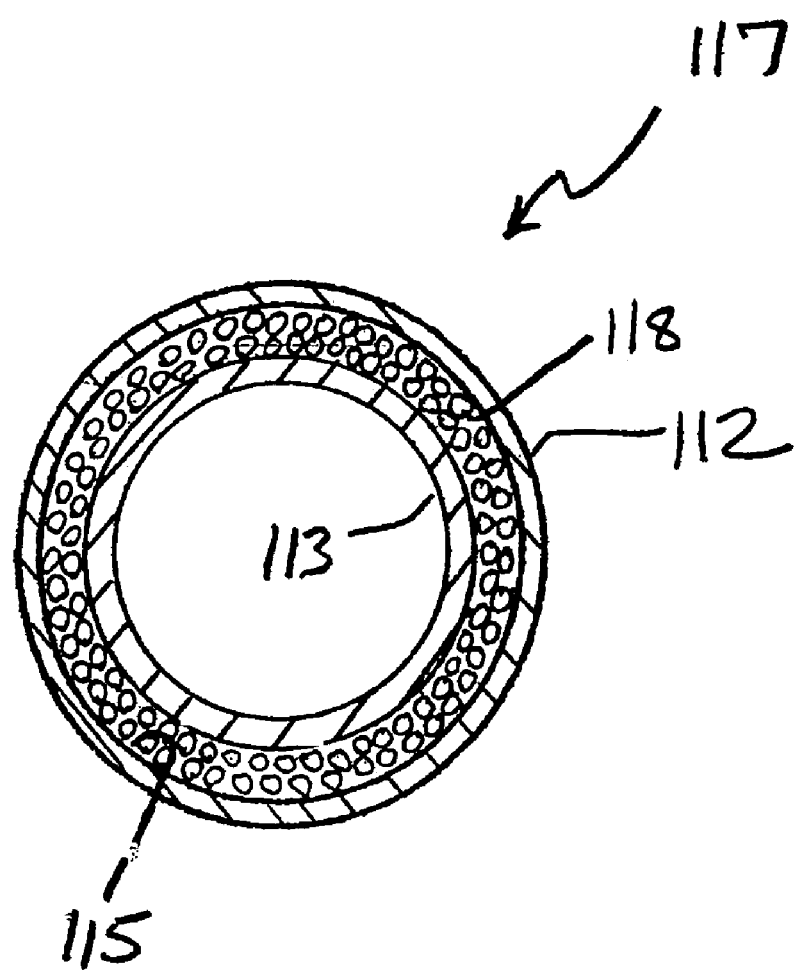
FIG. 9 is a cross-sectional view of the filter element of the fuel filter of FIG. 2, taken along a plane perpendicular to the longitudinal axis thereof.

A fuel filter 110, which is a modified variation of the basic filter design of FIG. 1, is shown in FIGS. 8-9. In this variation, the housing 11 is exactly the same as discussed above in connection with the first embodiment, but the filter element 117 is different. In the embodiment of FIGS. 8-9, the filter element 117 includes two relatively thin spaced-apart layers of fiber webbing 112, 113, which define a storage area 115 therebetween.

In this embodiment, the fibers making up the fiber webbing 112, 113 may be the shaped wicking fibers 20 discussed above, or alternatively, may be conventional non-woven fibers. Where the wicking fibers 20 are used for the webbing 112, 113, a plurality of solid particles 18 and/or one or more sulfur-treating reagents may be disposed within the cavities 22 thereof, as previously discussed.

In this embodiment, the two spaced-apart layers of fiber webbing 112, 113 cooperate to retain an inner layer of particles 118 therebetween in the storage area 115.

The particles 118 within the storage area 115 may be pellets all having a similar shape, or may be irregularly-shaped. The particles 118 may be loose and unattached, or alternatively, may be held together with a suitable glue or binder. The composition of the particles 118 may be substantially homogeneous, or the particles may be a combination of different materials mixed together, such as for example, activated carbon mixed with porous, fired clay particles.

The particles 118 may include one or more sorbent materials selected from the group consisting of activated carbon, zeolites, clay, silica gel, silicon dioxide, aluminum oxide and mixtures thereof.

Further, the particles 118 within the storage area 115 may be operatively associated with an additional sulfur-treating compound, which may be applied as a coating thereon, or which may be otherwise operatively associated with the particles. Where used, this additional sulfur-treating compound may be a reagent selected from the group consisting of metals, metal oxides, metallic salts, organometallic compounds, catalysts, and oxidizing agents.

Third Embodiment

Figure 10:
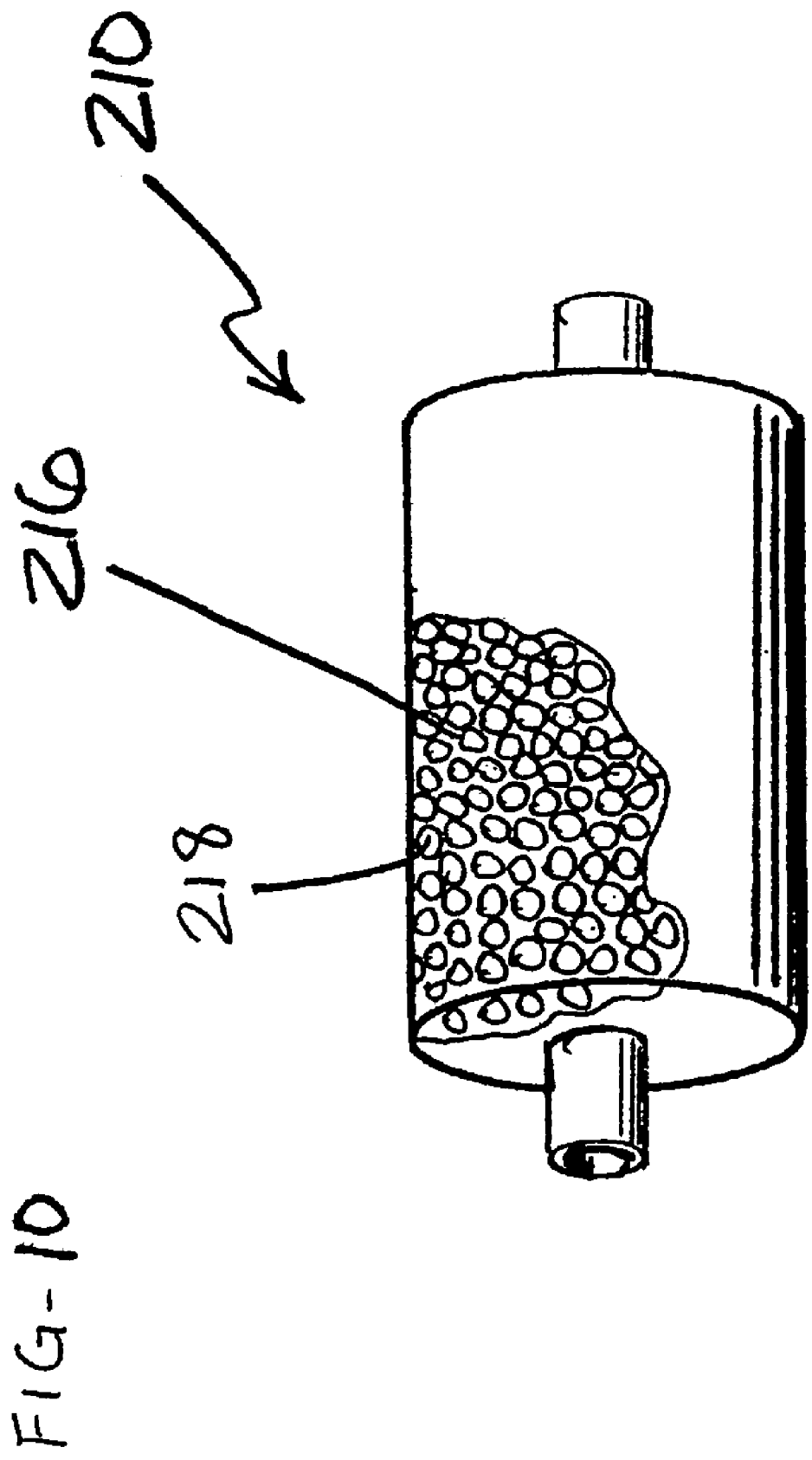
FIG. 10 is a perspective view, partially broken away, of a fuel filter according to a third embodiment of the present invention.

Referring now to FIG. 10, a fuel filter in accordance with a third embodiment of the invention is shown generally at 210. In the embodiment of FIG. 10, the fuel filter 210 is provided for use in a fuel application to filter a liquid fuel at a point of use thereof, and to remove sulfur compounds therefrom. Preferably, the filter 210 is adapted to remove thiophenes and related compounds from liquid fuel.

Illustrative examples of liquid fuels which the filter 10 may be used to filter include gasoline, diesel fuel, methanol, ethanol, fuel oil, and mixtures thereof.

One particularly preferred application, in which the filter hereof is adapted to be used, is on a vehicle. Another application is to filter liquid hydrocarbon fuel in preparation for using the fuel to power a fuel cell.

A fuel filter 210 according to the embodiment of FIG. 10 includes a thin-walled hollow housing 11 which is identical to the housing 11 described above in connection with the first embodiment.

A fuel filter according to FIG. 10 further includes a filter media 216, disposed in the chamber of the housing, for filtering liquid fuel and for removing sulfur compounds therefrom. The filter media comprises a sulfur-treating composition thereon for reacting with sulfur-containing compounds.

In the embodiment of FIG. 10, the filter media includes a plurality of substantially inert particles 218, and a reagent operatively associated with the particles.

The particles may be solid or porous, and may be homogeneous or else may be a mixture of different materials. The particles may be regularly-shaped pellets, or alternatively, may be irregularly shaped. The particles may comprise one or more sorbent materials selected from the group consisting of activated carbon, zeolites, clay, silica gel, silicon dioxide, aluminum oxide and mixtures thereof.

The particles may be porous or non-porous.

The selected sulfur-treating reagent may be applied as a coating on the surfaces of the particles, and/or may be disposed in interstices within or between porous particles. The reagent may be selected from the group consisting of metals, metal oxides, metallic salts, organometallic compounds, catalysts, and oxidizing agents.

Fourth Embodiment—Sulfur-Reducing System

The present invention also encompasses a sulfur-reducing system for removing sulfur-containing compounds from a liquid fuel. A sulfur-reducing system in accordance with the invention relates to equipment for precipitating out sulfur-containing compounds from liquid fuel, i.e., rendering such compounds insoluble in the fuel, and filtering the resulting precipitate out of the fuel.

Figure 11:
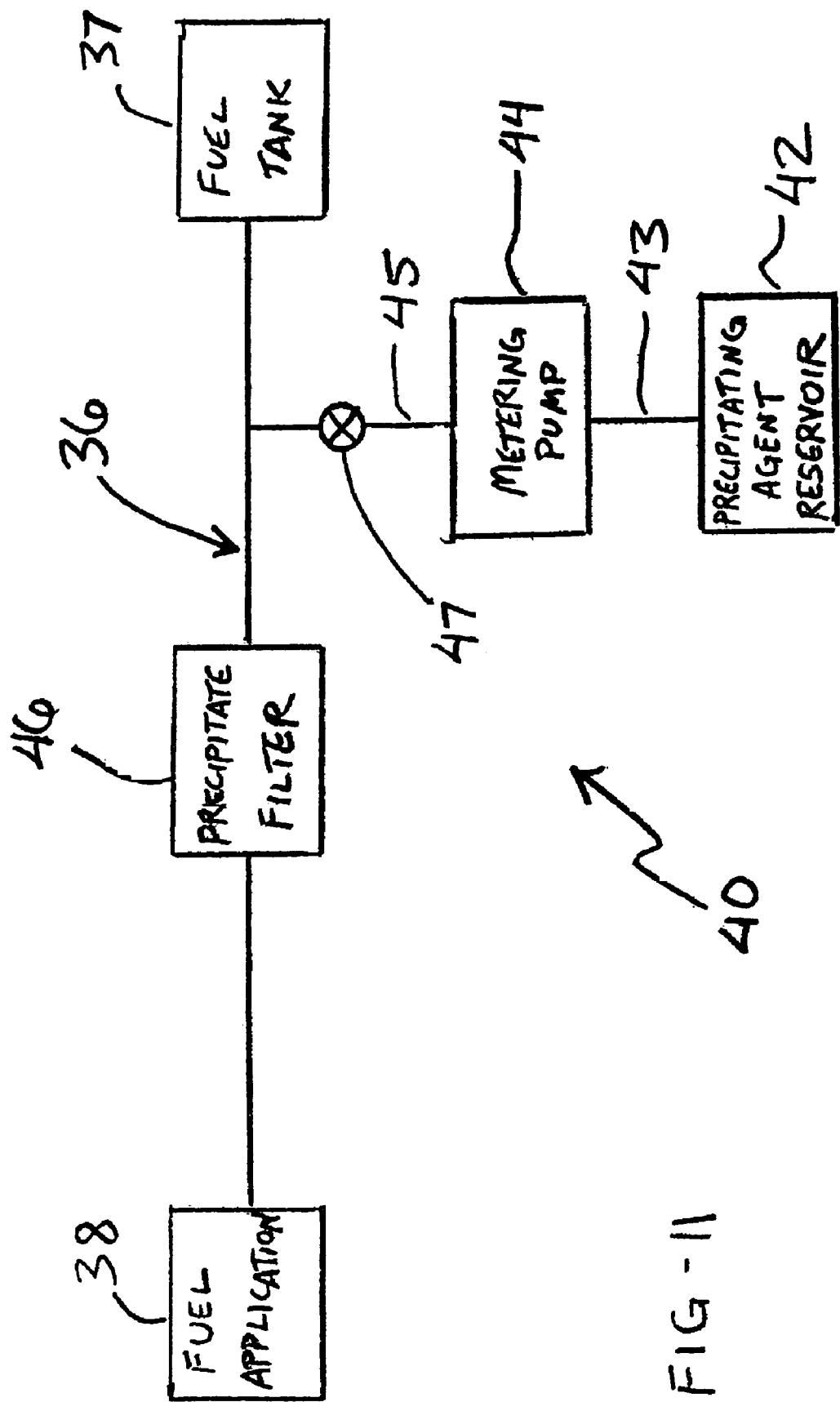
FIG. 11 is a simplified block diagram showing a sequence of steps in a preferred method according to the invention.

Referring now to FIG. 11, a sulfur-reducing system 40 according to the invention is provided in fluid communication with a fuel line 36 connecting a fuel storage tank 37 to a fuel application 38. This fuel application 38 may be an internal combustion engine or, alternatively, may be a fuel cell, a liquid fuel-burning heating system, or other application for a liquid fuel.

The sulfur-reducing system 40 includes a reservoir 42 for storing a precipitating agent therein, a metering pump 44 for dispensing the precipitating agent from the reservoir and for adding the precipitating agent to the liquid fuel at a first location, and a filter 46, for removing a sulfur-containing precipitate from the fuel, downstream of the point where the precipitating agent is added.

Preferably, the sulfur-reducing system also includes a first feed line 43 for connecting the reservoir 42 to the metering pump 44, a second feed line 45 for connecting the metering pump 44 to the fuel line 36, and a check valve 47 for preventing back flow from the fuel line 36 toward the metering pump 44.

The filter 46 used as part of the system should be a replaceable in-line fuel filter. The filter 46 could be a filter 10, 110 or 210 as previously described herein.

Alternatively, the filter 46 used in connection with the system 40 could be a more conventional type of in-line fluid filter, so long as it included a number of specific components. In order to be usable with the system hereof, a fuel filter should include a housing with some type of filter media therein. One usable filter is according to the general design of FIGS. 1-2, having a thin-walled hollow housing body defining a chamber therein, an inlet connected to the housing body and in fluid communication with the chamber thereof, an outlet connected to the housing body and in fluid communication with the chamber thereof, and a filter media disposed in the housing chamber for filtering precipitate from said liquid fuel and for thereby removing sulfur-containing compounds therefrom.

Methods

The present invention also contemplates methods of filtering liquid fuel, proximate a point of use thereof, to reduce the content of sulfur-containing compounds in the fuel.

A first step in a preferred method of filtering fuel involves transferring the fuel from a reservoir through a fuel line and into a fuel filter. This first step is shown at 50 in FIG. 12. In a specific application of the method, this first step may involve pumping a liquid fuel from a fuel tank through a fuel line on a vehicle and into a fuel filter of a type described herein.

The next step in the method hereof involves treating the fuel by passing it through the fuel filter and over a filter media housed therein. The selected filter media includes a reactant selected for its ability to react with thiophenes and reduce the concentration thereof in said fuel;

whereby the concentration of sulfur-containing compounds in the fuel is reduced.

Figure 12:
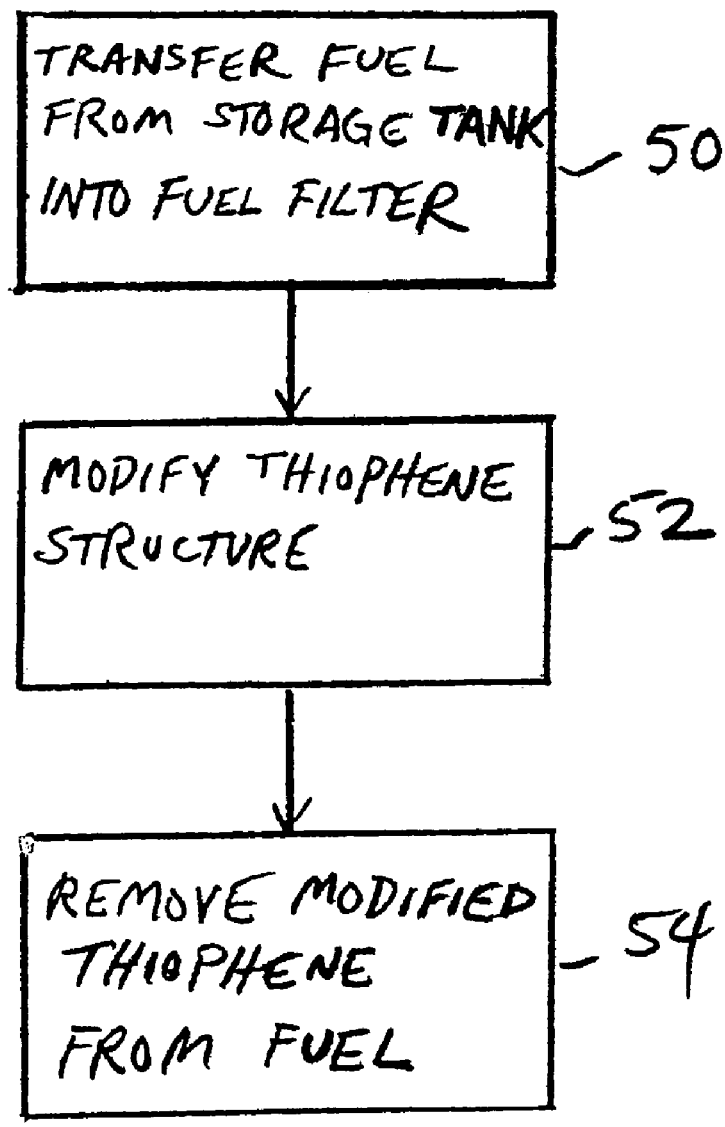
FIG. 12 is a schematic diagram showing a fuel system according to a fourth embodiment of the invention.

In a preferred application of the method hereof, the second step of the method involves modifying the structure of a thiophene, and this step is shown at 52 in FIG. 12.

Another step in the preferred method hereof involves removing sulfur-containing compositions from the fuel. This step may include removing a modified thiophene from the fuel, which is shown at 54 in FIG. 12.

In practicing the method hereof, the filter media may include a plurality of shaped fibers having hollow channels formed therein, as discussed above in connection with FIGS. 3-7.

Another optional refinement to the method is the inclusion of a sorbent material disposed within the hollow channels of the fibers. The sorbent material may include one or more materials selected from the group consisting of of activated carbon, zeolites, clay, silica gel, silicon dioxide, aluminum oxide and mixtures thereof.

Still another optional refinement to the method is the inclusion of a reagent or catalyst in the filter for reacting with thiophenes to remove them from the fuel. The reagent used may be selected from the group consisting of metals, metal oxides, metallic salts, organometallic compounds, catalysts, and oxidizing agents.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A method of filtering fuel, comprising the steps of:
   a) transferring the fuel from a reservoir through a fuel line and to a liquid fuel filter;
   b) treating the fuel by passing it through the liquid fuel filter and over a liquid fuel filter media housed therein, said liquid fuel filter media comprising a plurality of substrate particles comprising a substance selected from the group consisting of activated carbon, zeolites, clay, silica gel, silicon dioxide, aluminum oxide and mixtures thereof, and a reactant selected for its ability to react with thiophenes and reduce the concentration thereof in said fuel;
   whereby the concentration of sulfur-containing compounds in the fuel is reduced.

2. A method filtering filter fuel, comprising the of:
   transferring the fuel by passing it through a fuel line and to a liquid fuel filter
   treating the fuel by passing it though the liquid fuel filter and over liquid fuel filter media housed therein, said liquid fuel filter media comprising a reactant selected for its ability to react with thiophenes and reduce the concentration there in said fuel;
   whereby the concentration of sulfur-containing compounds in the fuel is reduced, wherein the liquid fuel filter media comprises a plurality of shaped fibers having hollow channels formed therein.

3. The method of claim 2, wherein a plurality of solid particles are disposed within the hollow channels of the fibers.

4. The method of claim 1, wherein said substrate particles are operatively associated with a substance selected from the group consisting of metals, metal oxides, metallic salts, organometallic compounds, catalysts, and oxidizing agents.

5. The method of claim 4, wherein said liquid fuel filter media further comprises a reagent selected from the group consisting of metals, metal oxides, metallic salts, organometallic compounds, catalysts, and oxidizing agents.

6. A method of reducing a concentration of sulfur-containing compounds from a liquid fuel, comprising:
   adding a precipitating agent to said fuel at a first location between a fuel storage tank and a fuel application, whereby a sulfur-containing compound in said fuel is precipitated out of solution therein; and
   passing said fuel through a liquid fuel filter to remove said precipitate from said fuel.

7. A method of filtering fuel of a reservoir in fluid communication with a liquid fuel filter, comprising:
   transferring fuel from the reservoir to the liquid fuel filter;
   passing fuel through a liquid fuel filter media disposed within the liquid fuel filter, said liquid fuel filter media comprising: a plurality of substrate particles comprising a substance selected from the group consisting of activated carbon, zeolites, clay, silica gel, silicon dioxide, aluminum oxide and mixtures thereof, a sulfur-treating composition operatively associated with said liquid fuel filter media and for reacting with sulfur-containing compounds, wherein the concentration of sulfur-containing compounds in the fuel is reduced by passing the fuel through said liquid fuel filter media.

8. A method of filtering fuel of a reservoir in fluid communication with a liquid fuel filter, comprising:
   transferring fuel from the reservoir to the liquid fuel filter;
   passing fuel through a liquid fuel filter media disposed within the liquid fuel filter, said liquid fuel filter media comprising: a sulfur-treating composition operatively associated with said liquid fuel filter media and for reacting with sulfur-containing compounds, wherein the concentration of sulfur-containing compounds in the fuel is reduced by passing the fuel through said liquid fuel filter media, wherein the liquid fuel filter media comprises a plurality of shaped fibers having hollow channels formed therein.

9. The method of claim 8, wherein a plurality of solid particles are disposed within the hollow channels of the fibers.

10. The method of claim 8, wherein said substrate particles are operatively associated with a substance selected from the group consisting of metals, metal oxides, metallic salts, organometallic compound, catalysts, and oxidizing agents.

11. The method of claim 10, wherein said liquid fuel filter media further comprises a reagent selected from the group consisting of metals, metal oxides, metallic salts, organometallic compounds, catalysts, and oxidizing agents.

* * * * *